(12) United States Patent
Mahr

(10) Patent No.: US 6,952,386 B1
(45) Date of Patent: Oct. 4, 2005

(54) DISC SPEED CONTROL DEVICE

(75) Inventor: Peter Mahr, Weiler (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 690 days.

(21) Appl. No.: 09/613,997

(22) Filed: Jul. 11, 2000

(30) Foreign Application Priority Data

Jul. 13, 1999 (EP) .................................. 99401755

(51) Int. Cl.⁷ .......................................... G11B 7/004
(52) U.S. Cl. ............................. 369/47.38; 369/47.39; 369/47.55
(58) Field of Search ................. 369/50, 47.1–47.48, 369/47.55, 47.56; 360/71, 72.1–72.3, 73.01–73.03

(56) References Cited

U.S. PATENT DOCUMENTS

| | | | |
|---|---|---|---|
| 4,679,181 A * | 7/1987 | Naito ...................... | 369/44.27 |
| 4,855,978 A * | 8/1989 | Kanamaru ................ | 369/30.27 |
| 5,051,976 A | 9/1991 | Kawano et al. ............ | 369/50 |
| 5,412,629 A * | 5/1995 | Shirane ................... | 369/47.39 |
| 5,712,836 A * | 1/1998 | Kamoto et al. .......... | 369/47.46 |
| 5,825,732 A * | 10/1998 | Arataki .................... | 369/47.45 |
| 6,236,630 B1 * | 5/2001 | Kubo et al. .............. | 369/47.36 |
| 6,259,662 B1 * | 7/2001 | Matsui et al. ............ | 369/47.48 |

FOREIGN PATENT DOCUMENTS

| | | |
|---|---|---|
| EP | 0878795 | 11/1998 |
| JP | 10-106136 | 4/1998 |
| JP | 10106136 | 4/1998 |

* cited by examiner

*Primary Examiner*—David Davis
*Assistant Examiner*—Michael V. Battaglia
(74) *Attorney, Agent, or Firm*—Joseph S. Tripoli; Robert D. Shedd; Reitseng Lin

(57) ABSTRACT

A disc speed control device for use in a disc player and/or recorder having a pick-up for reading/recording data. The device comprises an inner loop which regulates a determined disc rotation speed value received at its input and an outer loop which delivers this speed value depending on a frequency at which data is read by the pick-up. The present invention is particularly useful in multistandard disc drives which need to adjust to different disc speed modes, for example, constant angular velocity, or constant linear velocity.

16 Claims, 1 Drawing Sheet

DISC SPEED CONTROL DEVICE

FIELD OF THE INVENTIION

The invention relates to a playing and/or recording device for a disc shaped information carrier, and more precisely to a disc speed control device.

BACKGROUND OF THE INVENTION

A playing and/or recording device for a disc shaped carrier is known to adjust the disc rotation speed depending on the nature of the disc. Typically two modes are used, namely Constant Angular Velocity and Constant Linear Velocity mode.

In CAV mode the disc is rotated at a constant rotation speed. This is for example the case for Compact Disc-ROM devices which are of widespread use as computer peripherals. In a start phase after the disc has been inserted in the CD-ROM player and is ready to be read, a leading value output means generates a determined start rotation speed value. This value is output to speed servo means which regulate disc actuating means such to rotate the disc at the start rotation speed. An instantaneous disc rotation speed may be obtained from a frequency signal which is generated by frequency generating means. The frequency generating means may for example be realized by a device which is directly measuring the rotations of a motor shaft in the disc actuating means. The speed servo means receive the frequency signal, compare the determined start rotation speed with the instantaneous disc rotation speed calculated from the frequency signal, and consequently regulate the disc actuating means such that the disc keeps rotating at the determined start rotation speed. Any other speed may now be adjusted by using the leading value output means.

Disc players and/or recording devices typically comprise a pick up which may be moved relative to the rotating disc in order to be positioned for reading and/or recording data at a determined location of the disc. In optical disc player for example the pick up comprises optical means which receive light reflected by the disc and project it on light detecting means. This way an output of the light detecting means is indicative of data scanned by the reflected light. The data may for example be recorded along tracks. The tracks form circles or a spiral having a center substantially located at a center of the disc rotation.

In CLV mode the disc is rotated such that data being read and/or recorded using the pick-up appears to be passing by the pick-up at a constant speed. This means that the disc rotation speed is actually higher when the pick-up accesses data near the center of the disc than when it accessed data near a periphery of the disc. This is for example the case in audio Compact Disc players. The disc rotation speed must be adjusted depending on where on the disc the pick-up is to access data. Typically an output of the pick-up, i.e., an output of the light detecting means is processed using signal processing means and a data frequency signal showing at which frequency data is read by the pick-up is obtained. The data frequency signal is compared to a desired frequency corresponding to a determined linear velocity and a speed servo circuit regulates the disc actuating means in a known manner such that the disk rotations speed remains adapted to have a data frequency signal substantially equal to the desired frequency.

Many players and/or recording devices for disc shaped carriers have the possibility to function in either the CAV or CLV mode. In order to realize this compatibility to CAV and CLV it is known to either have two distinct circuits for CAV and CLV or to modify the speed servo circuit of either one such that it may perform in both modes. The latter solution requires a relative high degree of complexity in the modified speed circuit. The former solution requires that in addition to the two distinct circuits, a possibility to switch between both circuits when appropriate be included.

SUMMARY OF THE INVENTION

It is an object of the present invention to eliminate the need for two distinct circuits which perform CAV or CLV.

It is another object of the present invention to lower the complexity of a speed servo circuit in a device performing CAV and CLV.

A disc speed control device according to the invention is for use in a player and/or recorder of a disc shaped information carrier to read or record data along data tracks, the data being read and/or recorded using a pick-up, and comprises frequency generating means for generating a frequency signal having a frequency representative of a rotation speed of the disc, disc actuating means for rotating the disc, speed servo means which receive the frequency signal and the determined rotation speed value, and which regulate the disc actuating means to the determined rotation speed value, signal processing means which process an output of the pick-up when the data is being read and deliver a data frequency signal, and speed processing means which receive and use the data frequency signal to compute the determined rotation speed value.

The invention will in the following be explained using examples and Figures.

DETAILED DESCRIPTION OF PREFERED EMBODIMENTS

Figure 1:
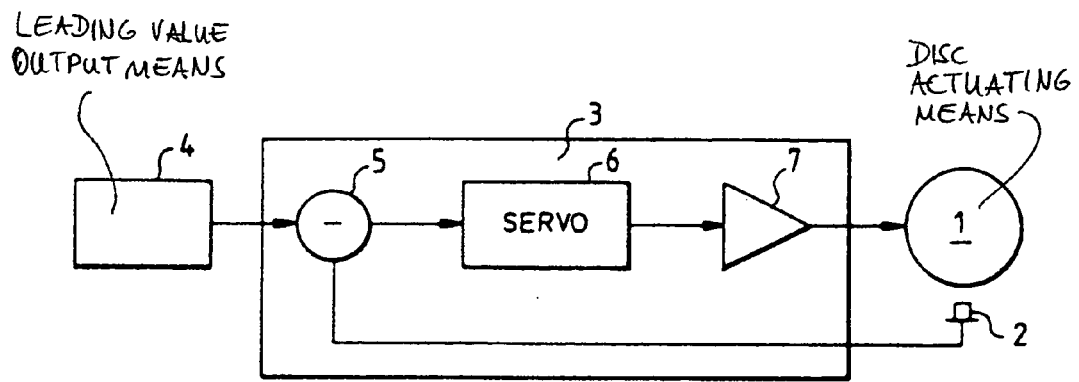
FIG. 1 contains a schematic speed regulating circuit according to the prior art, FIG. 2 contains a schematic speed regulating circuit according to the invention.

FIG. 1 shows a schematic representation of known disc actuating means 1 which are used to rotate a disc shaped data carrier (not shown). A frequency generating means 2 measures for example the rotations of a motor shaft (not shown) which rotates in the disc actuating means 1. The frequency generating means 2 thereby generate a frequency signal which has a frequency representative of a rotation speed of the disc, and transmit this to speed servo means 3. A leading value output means 4 generates a determined rotation speed value which is transmitted to the speed servo means 3. The determined rotation speed value corresponds to a desired rotation speed in CAV mode.

The speed servo means 3 comprises a comparator means 5 which receives both the frequency signal and the determined rotation speed value, compares both inputs and delivers the result of the comparison to a regulating means 6. The regulating means 6 outputs a regulating signal to the disc actuating means 1 through an amplifier 7 such that a rotation of the disc shaped data carrier at the determined rotation speed value is obtained. This means that the disc actuating means will accelerate or decelerate the disc rotation depending on respectively if the frequency signal indicates an instantaneous speed smaller or greater than the determined rotation speed value. Hence a CAV mode operation is achieved because the disc rotating is regulated at a constant determined rotation speed.

Figure 2:
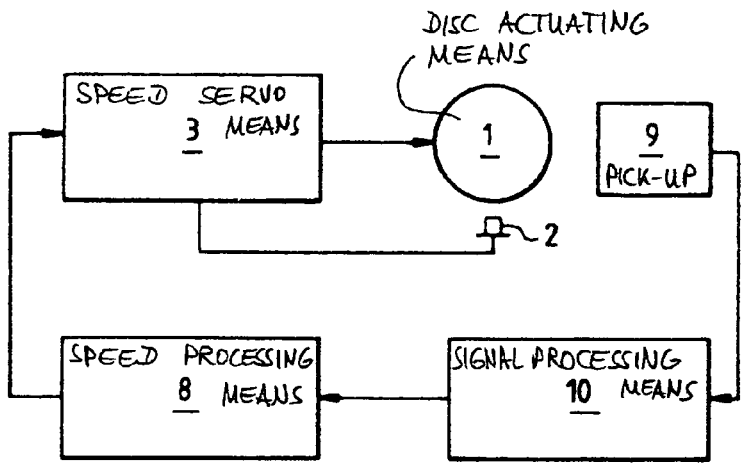

In FIG. 2, the determined rotation speed value is provided to the speed servo means 3 by speed processing means 8. A pick-up 9 is used to read data from the rotating disk shaped carrier (not shown) and delivers to a signal processing means 10 a signal representative of the data scanned from the disc. The signal processing means 10 allows to generate a data frequency signal which depends on the frequency at which data is scanned by the pick-up, i.e., on the linear velocity at which the disc passes by the pick-up 9. The speed processing means 8 receives the data frequency signal and computes the determined rotation speed value. In case a CLV mode is to be achieved, the determined rotation speed value will depend on the location of the disc at which the pick-up 9 reads the data. The speed servo means 3 then regulates the disc actuating means 1 to rotate the disc at the determined rotation speed value.

To read includes reading data stored in the form of pits in the form of depressions or elevations, dark or bright areas, areas differing in other physical properties as for example magnetic properties, optical properties, electrical properties or geometric properties, like a differently wobbled track. In case of a recording device, data is also read during a recording process. For example during following the track prerecorded areas in the form of pits or wobble information are read and evaluated, even when recording is performed.

The described example in fact acts as a system of two loops: an inner loop comprising the speed servo means 3, the disc actuating means 1 and the frequency generating means 2, and receiving a determined rotation speed value at its input. The second loop may be called outer loop or control loop and provides the determined rotation speed value to the input of the inner loop.

The outer loop and more precisely the speed processing means 8 which is part of it, may typically provide processing of the data frequency signal for achieving CLV mode.

In a preferred embodiment, the outer loop may also provide processing for one or many of the following situations:

a) Constant speed value. In this situation, the speed processing means output a constant value for the determined disc rotation speed. Such a situation occurs for example in a start phase when the disc is inserted in the player and/or recorder, or in CAV mode when the player is used as a CD-ROM drive;

b) Freeze the instantaneous speed in case of error. This situations occurs, for example, when the signal processing means 10 are not in a state to deliver a data frequency signal because data on the disc is unreadable. The speed processing means registers the absence of the data frequency signal and outputs a speed value which was stored previous to the occurrence of an error. This way, the rotation speed may be controlled until the pick-up 9 scans readable data and a data frequency signal is generated again.

c) Generate a speed profile in case of jumps or smooth acceleration. This situation may, for example, occur when data is read in CLV mode and the pick-up is moved towards the periphery of the disc in a so-called jump, i.e., when many tracks are crossed to access data. The speed processing means anticipates the final rotation velocity required to read data on the accessed track and outputs the final rotation velocity as determined disc rotation-speed to the inner loop during the jump while no data is read. This allows to save time. In another example, the speed servo means 8 simply generates a smooth acceleration of the disc rotation speed by successive outputting increasing speed values to the inner loop, the result being that when the disc rotates at higher speeds, data may be read at a higher rate.

Figure 3:
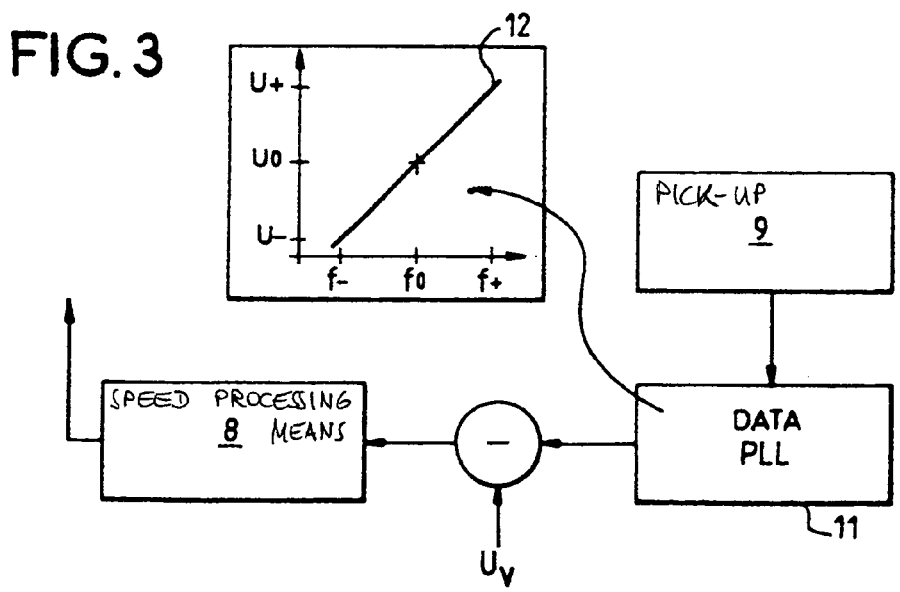
FIG. 3 illustrates a preferred embodiment of the invention.

FIG. 3 shows a preferred embodiment of an outer loop. A data Phase Locked Loop 11 receives an output from the pick-up 9. The data PLL 11 comprises means for generating a voltage U depending on a frequency of the read data rate which is defined as a PLL frequency f. The data PLL 11 outputs the voltage U according to a voltage curve 12. The voltage curve 12 shows that PLL frequencies f−, f0 and f+ correspond to voltage U−, U0 and U+. The speed processing means 8 receives at its input the voltage output by the data PLL 11 and a reference voltage Uv; the input voltages are compared and depending on the result the speed processing means 8 output a higher or smaller determined disc rotation value, such that the PLL frequency remains substantially at the frequency f0. Hence a CLV mode may be achieved.

The disc speed control devices described here are given as examples only and a person skilled in the art may realize other embodiments of the invention while remaining in the scope of the invention.

The disc speed control device according to the invention is particularly advantageous in that it may easily be used for various kinds of recording and/or playing modes. This is especially useful in multi-standard disc drives which need to adjust many different disc speeds to read or record data.

What is claimed is:

1. Disc speed control device for use in a player or recorder of a disc shaped information carrier to read or record data along data tracks, the data being read or recorded using a pick-up, the device comprising:

disc actuating means for rotating the disc in a first mode at a constant linear velocity or a second mode at a constant angular velocity;

the pick-up for reading the data from the rotating disc and producing an output signal representative of scanned data from the rotating disc;

frequency generating means for generating a rotation speed frequency representative of a rotation speed of the rotating disc;

signal processing means for processing the output signal of the pick-up and creating a data frequency signal, the data frequency signal being related to a frequency at which the data is scanned by the pick-up;

a speed processing means for receiving the data frequency signal and computing a determined rotation speed value for said first mode and said second mode wherein in the first mode the determined rotation speed value further depends on a location of the rotating disc at which the pick-up scans the data; and speed servo means including a speed comparator used in both the first and second modes for receiving and comparing the rotation speed frequency signal and the determined rotation speed value and for regulating the disc actuating means in response to the determined rotation speed value.

2. Disc speed control device according to claim 1, wherein the signal processing means comprises a data phase locked loop means which outputs a voltage corresponding to a phase locked loop frequency of a rate at which the data is read by the pick-up, and a reference voltage source which delivers a reference voltage at an input of the speed processor.

3. Disc speed control device according to claim 1, wherein:
the speed servo means which receives the determined rotation speed value, the disc actuating means and the frequency generating means form a first loop; and
further comprising:
a second loop which provides the determined rotation speed value to an input of the first loop and which provides processing of the data frequency signal in the first mode.

4. Disc speed control device according to claim 3, wherein the second loop processes:
a constant speed value wherein the speed processor outputs a constant value for the determined rotation speed value in a start phase when the disc is inserted in the player or the recorder, or in the second mode when the player or the recorder is used as a CD-ROM drive.

5. Disc speed control device according to claim 4, wherein the second loop further freezes an instantaneous speed in the event of error wherein the speed processor registers an absence of the data frequency signal and outputs the determined rotation speed value which was stored previous to the occurrence of the error to control the disc actuating means until the pick-up scans readable data and the data frequency signal is generated again.

6. Disc speed control device according to claim 5, wherein the second loop further generates a speed profile in case of jumps or smooth acceleration when the data is read in the first mode and the pick-up is moved towards a periphery of the disc in a so-called jump, thus, the speed processor anticipates a final rotation velocity required to read the data on an accessed track and outputs the final rotation velocity as the determined rotation speed value to the first loop during the jump while no data is read.

7. Disc speed control device according to claim 6, wherein:
the speed servo means generates a smooth acceleration of the determined rotation speed value by successively outputting increasing speed values to the first loop so that when the disc rotates at higher speeds, the data may be read at a higher rate.

8. Disc speed control device according to claim 3, wherein the second loop comprises:
a data phase locked loop which receives the output signal from the pick-up, the data phase locked loop comprising:
means for generating a voltage depending on a frequency of a read data rate which is defined as a phase locked loop frequency,
a voltage curve having a correspondence between phase locked loop frequencies and said voltage, and
an output of said voltage according to said voltage curve; and
said speed processor which receives at its input said output by the data phase locked loop and a reference voltage both of which are compared and, depending on a result of the comparison, outputs a higher or smaller determined rotation speed value.

9. Disc speed control device for use in a player or recorder of a disc shaped information carrier to read or record data along data tracks, the data being read or recorded using a pick-up, the device comprising:
a disc actuator which rotates the disc in a first mode at a constant linear velocity or a second mode at a constant angular velocity;
the pick-up which reads the data from the rotating disc and produces an output signal representative of scanned data from the rotating disc;
a frequency generator which generates a rotation speed frequency representative of a rotation speed of the rotating disc;
a signal processor which processes the output signal of the pick-up and creates a data frequency signal, the data frequency signal being related to a frequency at which the data is scanned by the pick-up;
a speed processor which receives the data frequency signal and computes a determined rotation speed value for said first mode and said second mode wherein in the first mode the determined rotation speed value further depends on a location of the rotating disc at which the pick-up scans the data; and
a single speed servo including a speed comparator used in both the first and second modes, the speed servo receiving and comparing the rotation speed frequency signal and the determined rotation speed value and regulating the disc actuating means in response to the determined rotation speed value.

10. Disc speed control device according to claim 9, wherein the signal processor comprises a data phase locked loop which outputs a voltage corresponding to a phase locked loop frequency of a rate at which the data is read by the pick-up, and a reference voltage source which delivers a reference voltage at an input of the speed processor.

11. Disc speed control device according to claim 9, wherein:
the speed servo which receives the determined rotation speed value, the disc actuator and the frequency generator form a first loop; and
further comprising:
a second loop which provides the determined rotation speed value to an input of the first loop and which provides processing of the data frequency signal in the first mode.

12. Disc speed control device according to claim 11, wherein the second loop processes:
a constant speed value wherein the speed processor outputs a constant value for the determined rotation speed value in a start phase when the disc is inserted in the player or the recorder, or in the second mode when the player or the recorder is used as a CD-ROM drive.

13. Disc speed control device according to claim 12, wherein the second loop further freezes an instantaneous speed in the event of error wherein the speed processor registers an absence of the data frequency signal and outputs the determined rotation speed value which was stored previous to the occurrence of the error to control the disc actuator until the pick-up scans readable data and the data frequency signal is generated again.

14. Disc speed control device according to claim 13, wherein the second loop further generates a speed profile in case of jumps or smooth acceleration when the data is read in the first mode and the pick-up is moved towards a periphery of the disc in a so-called jump, thus, the speed processor anticipates a final rotation velocity required to read the data on an accessed track and outputs the final rotation velocity as the determined rotation speed value to the first loop during the jump while no data is read.

15. Disc speed control device according to claim 14, wherein:
the speed servo generates a smooth acceleration of the determined rotation speed value by successively outputting increasing speed values to the first loop so that when the disc rotates at higher speeds, the data may be read at a higher rate.

16. Disc speed control device according to claim 11, wherein the second loop comprises:
   a data phase locked loop which receives the output signal from the pick-up, the data phase locked loop comprising:
      means for generating a voltage depending on a frequency of a read data rate which is defined as a phase locked loop frequency,
      a voltage curve having a correspondence between phase locked loop frequencies and said voltage, and
      an output of said voltage according to said voltage curve; and
   said speed processing means which receives at its input said output by the data phase locked loop and a reference voltage both of which are compared and, depending on a result of the comparison, outputs a higher or smaller determined rotation speed value.

* * * * *